United States Patent [19]

Pouget

[11] 4,069,988
[45] Jan. 24, 1978

[54] RETRACTING DEVICE FOR A SAFETY BELT

[75] Inventor: René J. Pouget, Levallois-Perret, France

[73] Assignee: Aciers et Outillage Peugeot, Audincourt, France

[21] Appl. No.: 578,898

[22] Filed: May 19, 1975

[30] Foreign Application Priority Data

May 24, 1974 France .................................. 74.18043

[51] Int. Cl.² ......................... A62B 35/02; B65H 75/48
[52] U.S. Cl. .............................................. 242/107.4 A
[58] Field of Search ................ 242/107.4 A, 107.4 R, 242/107.4 B–107.4 E; 297/388; 280/744–747

[56] References Cited

U.S. PATENT DOCUMENTS

| | | | |
|---|---|---|---|
| 3,552,676 | 1/1971 | Weber | 242/107.4 A |
| 3,841,581 | 10/1974 | Salamon | 242/107.4 A |
| 3,913,861 | 10/1975 | Stephenson et al. | 242/107.4 A |
| 3,938,754 | 2/1976 | Stephenson et al. | 242/107.4 A |
| 3,938,755 | 2/1976 | Stephenson et al. | 242/107.4 A |

*Primary Examiner*—Harvey C. Hornsby
*Assistant Examiner*—John M. Jillions
*Attorney, Agent, or Firm*—Eric P. Schellin

[57] ABSTRACT

The retractor comprises a mandrel rotatably mounted on a support and around which the belt is wound. A spring biases the mandrel to rotate it in a direction to wind the belt onto the mandrel. Locking means are combined with the mandrel for preventing rotation of the mandrel. An acceleration detector is associated with the locking means to actuate the latter when the acceleration of the vehicle exceeds a predetermined value. A rocker is freely pivotably suspended from the support and the acceleration detector is carried by the rocker. The center of gravity of the rocker is offset from the axis of rotation of the mandrel.

8 Claims, 4 Drawing Figures

RETRACTING DEVICE FOR A SAFETY BELT

The present invention relates in a general way to safety equipment for vehicles and more particularly to a safety belt retractor employed in particular in automobile vehicles.

At the present time, there is an increasing tendency to mount on private automobile vehicles safety belts or straps termed "three-point belts", the belt comprising an abdomen part and a shoulder part. If the vehicle is moreover equipped with automatic retractors for each belt the upper anchoring point of the shoulder part of the belt is then formed by a direction-changing element around which the belt passes for extending downwardly toward the retractor which is mounted laterally with respect to the seat on the floor or in a housing formed in the body of the vehicle.

Such an arrangement of the belt and retractor have several drawbacks one of which is an excessive active length of the belt. Indeed, the portion of the belt which is located in the vertical position relative to the direction-changing element of the retractor, while it transmits the retaining force it does not directly serve to retain the passenger in the course of a sudden acceleration. Moreover, when the position of the seat and the backrest of the seat are adjustable, the shoulder part lengthens as the seat is more advanced and the backrest less inclined.

These drawbacks could be easily overcome by incorporating the retractor in the backrest of the seat itself near to the upper edge of the seat, but up to the present time one has hesitated to do this owing to the fact that the present-day retractors can only operate correctly at the rate of acceleration for which they are regulated if they are located in a well-determined position in space. Now, it is clear that if the retractor is mounted on an adjustable backrest whose position may be more or less inclined this results in a modification of its rating. Moreover, a retractor of the prior art has a rating which is responsive to variations in the angular position of the vehicle itself.

An object of the invention is to provide a retractor for a safety belt whose rating is constant irrespective of the angular position of the retractor.

In a preferred embodiment of the invention, the retractor comprises a device, which is responsive to accelerations and cooperates with means for stopping the rotation of a mandrel around which the safety belt is wound. This device responsive to accelerations is mounted on a rocker which is mounted to freely rotate on the support of the retractor. A shock-absorbing or damping device is preferably associated with the rocker to absorb the movement in the case of a sudden acceleration of the retractor or when the inclination of the backrest of the seat is modified.

Further features of the invention will be apparent from the ensuing description.

In the accompanying drawing given solely by way of example:

Figure 1:
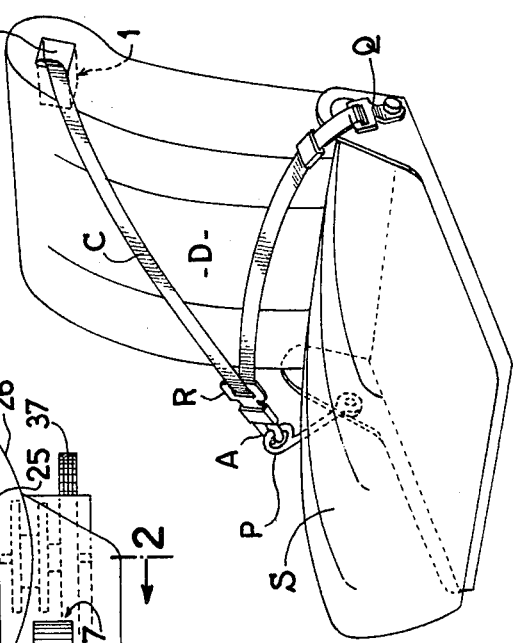
FIG. 1 is a diagrammatic perspective view of an automobile vehicle seat having an adjustable backrest in which the retractor according to the invention is incorporated.

FIG. 1 shows a vehicle seat S having a backrest D which is inclinable and provided with a safety belt or strap C. This belt may be attached at an anchoring point P by means of a fastener A which is provided with a direction-changing element R. The belt is also anchored at the point Q of the seat adjacent the side of the seat opposed to the anchoring point P, also integral with the seat. The belt is provided with a retractor 1 disposed in a housing 2 in the seat S whence the belt extends for descending toward the element R.

Figure 3:
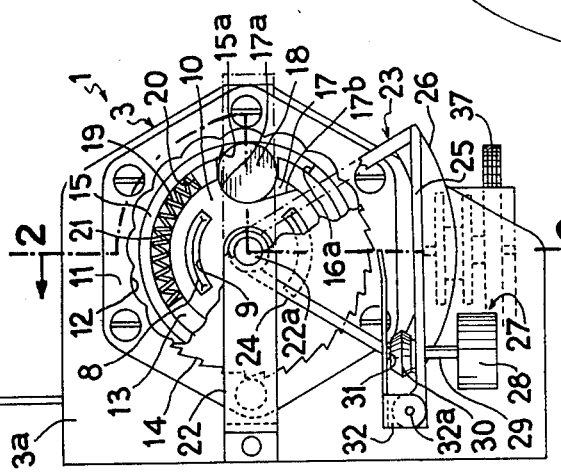
FIG. 3 is a side elevational view of the retractor viewed in the direction of arrows 3—3 of FIG. 2.
Figure 2:
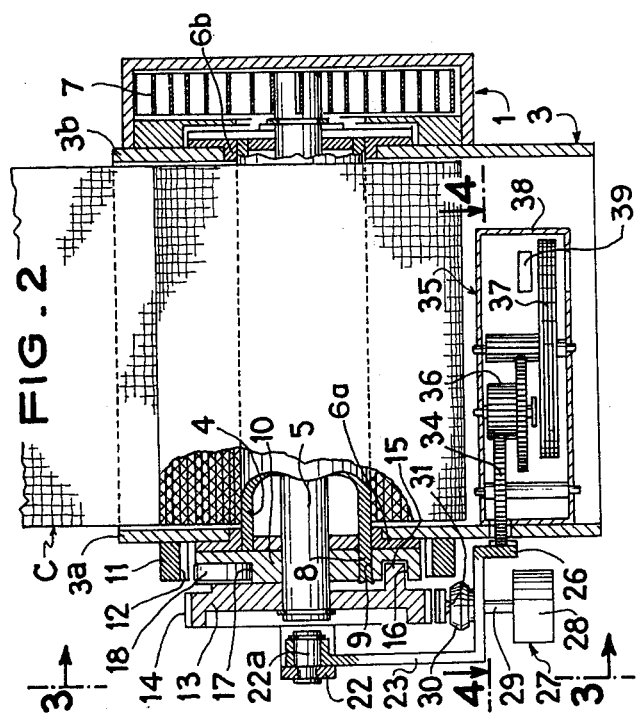
FIG. 2 is an axial sectional view, to an enlarged scale, of such a retractor.
Figure 4:
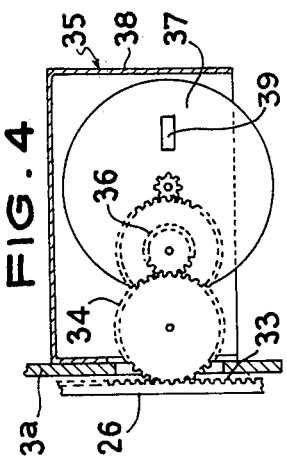
FIG. 4 is a sectional view, taken on line 4—4 of FIG. 2, of a detail of the retractor.

In FIGS. 2 to 4, it can be seen that according to a preferred embodiment of the invention, the retractor 1 comprises a yoke 3 firmly fixed in the housing 2 of the backrest D. The branches 3a and 3b of this yoke 3 are traversed by a mandrel 4 and a shaft 5 which are coaxial, connected to rotate with each other and are rotatably mounted in the branches 3a and 3b through washers 6a and 6b constituting bearings. One of the ends of the shaft 5 is split and receives the end of a spiral return spring 7, whereas the belt C is attached to the mandrel 4 and wound around the latter, the arrangement being such that the belt constantly tends to be wound around the mandrel 4.

The mandrel 4 is extended outside the branch 3a of the yoke by two arcuate tabs 8 which are engaged in corresponding slots 9 provided in a plate 10 integral with the mandrel 4 and the shaft 5. The latter also extends out of the branch 3a.

The plate 10 is surrounded by an annular coaxial ring 11 firmly fixed to the outer surface of the branch 3a of the yoke 3 and having on its inner periphery juxtaposed cavities 12 constituting teeth, the cavities having a round shape.

A flywheel 13 is freely rotatable on the free end of the shaft 5 and comprises outer teeth 14 which enable it to perform the function of a ratchet wheel. A circular rib 15 is formed on the inner surface of this flywheel. This rib is engaged in a circular groove 16 in the plate 11. The latter comprises two notches 17 which are diametrally opposed and formed in its peripheral edge.

Each notch comprises a portion of a circular wall 17a which is extended by a cam surface 17b.

In front of the notches 17, the circular rib 15 is interrupted so as to define two passages 15a which cooperate with two corresponding openings 16a formed in the outer wall of the groove 16 of the plate 11.

Two circular wedging rollers 18 are respectively disposed in the notches 17, project radially from the notches and extend through the corresponding passages 15a and openings 16a of the plate 10 and flywheel 13. These rollers are normally applied against the circular wall 17a of the corresponding notch so that they are disengaged from the cavities 12 of the ring 11. On the other hand, when a relative angular movement occurs between the plate 10 and the flywheel 13, the rollers rise along the cams 17b and are urged outwardly thereby into two diametrally opposed cavities 12 of the ring 11 and this prevents the mandrel 4 from rotating.

A return spring 19 disposed in a peripheral opening 20 formed in the rib 15 cooperates with a peripheral cavity 21 formed in the inner wall of the groove 16 of the plate 10. This spring tends to prevent any relative movement between the plate 10 and the flywheel 13 and thus determines to a major extent the sensitivity of the retractor to sudden unwinding of the belt C.

The retractor further comprises a yoke 22 mounted on the outer surface of the branch 3a and carrying a bearing 22a coaxial with the shaft 5. Freely suspended from this bearing is a rocker 23 comprising a triangular frame 24 suspended by one of its corners, at the apex, from the yoke 22, a horizontal ledge 25 extending from the lower side of the frame in the direction of the branch 3a of the yoke 3, and a vertically extending mass 26, the assembly being in one piece.

A pendular acceleration detector 27 is mounted on the horizontal portion 25 of the rocker 23. It comprises a pendular mass 28 hooked to a rod 29 which extends to the portion 25 and which comprises at its upper end an inverted cup 30 by means of which the assembly is retained on the portion 25, the arrangement being such that the mass 28 is free to swing. The cup 30 is in contact with a boss 31 formed on a pawl 32 which cooperates with the teeth 14 of the flywheel 13 and is pivoted at 32a to one end of the horizontal portion 25.

The mass 26 is provided on the side thereof facing the outer face of the branch 3a with a toothed sector 33 which meshes with an input pinion 34 of a device 35 for absorbing or damping the swinging movements of the rocker 22.

This damping device comprises an intermediate reducing gear 36 and an inertia flywheel 37, the assembly being disposed in a box 38 mounted on the yoke. If desired, the flywheel 37 may be braked by braking means 39 generating eddy currents in the flywheel.

The retractor just described operates in the following manner:

It must be stressed that the retractor of the type just described has two distinct sensitivities, namely one sensitive to the sudden movements of the passenger causing an unwinding of the belt, and the other sensitive to accelerations and decelerations of the vehicle. Means putting into action these two sensitives are, as it were, "mounted in cascade" as will be explained hereinafter.

When the passenger produces a sudden unwinding of the belt, the mandrel 4 is driven in rotation together with the plate 10. The flywheel 13, having a certain inertia as regards rotation, does not move immediately so that the spring 19 is compressed. The rollers 18 then rise up their ramp 17b and are biased outwardly so as to penetrate the two diametrally opposed cavities 12. In this way the plate 10 is blocked and rendered integral with the ring 11 and the yoke 3. This brings into action the "belt sensitivity".

If the passenger moves slow enough to avoid compression of the spring 19, he can unwind the belt in opposition to the action of the spiral spring 7 without being hindered in his movements.

When the vehicle itself is subjected to a sudden acceleration or deceleration exceeding a certain predetermined value, the mass 28 reacts and swings and acts on the pawl 33. The latter enters the teeth 14 and prevents the flywheel 13 from rotating. As the belt unwinds owing to the movements of the passenger subsequent to acceleration of the vehicle, the plate 10 therefore rotates with respect to the flywheel 13 and the rollers 18 enter two corresponding cavities 12 of the ring 11.

The positioning of the pawl 32, the teeth 14 and the cavities 12 is chosen in such manner as to obtain the exit of the roller 18 in the plane of radial symmetry of the cavities 12 so as to prevent a possible blocking of the roller 18 on the crests of these cavities 12.

The pawl 32 and the teeth 14 therefore act as a relay of the detection, all the forces applied to the belt C being supported by the plate 10 and the ring 11. The means bringing into action the "vehicle sensitivity" can thus be of light construction, which increases the precision of operation.

The pendular detector 27 is insensitive to the angular position or attitude of the retractor itself. Indeed, as the rocker 23 is suspended freely from the yoke 22, it tends by the effect of gravity to always resume its position of equilibrium in which the portion 25 is horizontal, irrespective of the movements of the retractor about the axis of the mandrel 4.

The pendular detector 27 is also insensitive to accelerations owing to the effect of the damping device 35, which is engaged with the toothed sector 33, and in particular owing to the flywheel 37. The action of the latter is double. It regularizes by a damping action the movements of the rocker 23 as it searches its position of equilibrium. It opposes by its inertia the sudden movements of the rocker 23 and this permits the mass 28 to perform its detecting function at the required rating.

Note that according to a modification which has not been shown in the drawing, the rocker may be suspended by a universal joint so as to compensate for variations in the angle of the retractor in a plurality of planes.

Although in the presently-described embodiment there has been chosen as a type of retractor that comprising detecting means having a double sensitivity, it will be understood that the invention is also applicable to other types of retractors comprising a pendular detector of accelerations in a form different to that described hereinbefore.

Having now described my invention what I claim as new and desire to secure by Letters Patent is:

1. A retractor for a safety belt, in particular for an automobile vehicle, comprising means defining a support, a mandrel mounted to be rotatable relative to the support about an axis, the belt being wound around the mandrel, a return spring combined with the mandrel for biasing the mandrel to rotate in a direction for winding the belt onto the mandrel, locking means combined with the mandrel for preventing rotation of the mandrel, a rocker freely pivotably suspended from the support, an acceleration detector suspended on said rocker and responsive to acceleration exerted on said retractor so as to actuate said locking means upon detection of acceleration, a first pendular mass rigid with said rocker so as to offset the centre of gravity of said rocker below the axis of rotation of said mandrel whereby said first pendular mass maintains said rocker in a given position irrespective of variations of the attitude of said retractor, said retractor further comprising a damping device mounted on said support and operatively connected to said rocker for preventing immediate movement of said rocker when acceleration of said retractor occurs.

2. A retractor as claimed in claim 1, wherein said rocker includes a toothed sector, and the damping device comprises an input gear meshing with the sector, an inertia flywheel being rotatably mounted relative to said support and drivenly connected to the input gear.

3. A retractor as claimed in claim 2, comprising speed reducing means connecting the input gear to the flywheel.

4. A retractor as claimed in claim 2, wherein said damping device is provided with braking means mounted in the vicinity of said flywheel and acting by the effect of eddy currents thereon.

5. A retractor for a safety belt, in particular for an automobile vehicle, comprising means defining a support, a mandrel mounted to be rotatable relative to the support about an axis, the belt being wound around the mandrel, a return spring combined with the mandrel for biasing the mandrel to rotate in a direction for winding the belt onto the mandrel, locking means combined with the mandrel for preventing rotation of the mandrel, a rocker freely pivotably suspended from the support, an acceleration detector suspended on said rocker and responsive to acceleration exerted on said retractor so as to actuate said locking means upon detection of acceleration, a first pendular mass rigid with said rocker so as to offset the centre of gravity of said rocker below the axis of rotation of said mandrel whereby said first pendular mass maintains said rocker in a given position irrespective of variations of the attitude of said retractor, said retractor further comprising a bearing mounted on said support and coaxial with said mandrel, and wherein said acceleration detector is a pendular detector, said rocker comprising a triangular frame having an apex corner and a lower side below said apex corner, the frame being suspended by said apex corner, a horizontal ledge laterally extending from said lower side and carrying said acceleration detector, said horizontal ledge having a vertical extension constituting said first pendular mass.

6. A retractor as claimed in claim 5, wherein said first pendular mass is in the shape of a sector of a circle.

7. A retractor as claimed in claim 5, wherein said pendular acceleration detector comprises a second pendular mass, a rod extending through said horizontal ledge and an inverted cup bearing on an upper face of said ledge, the rod interconnecting the second pendular mass and cup.

8. A retractor as claimed in claim 7 further comprising a pawl which is pivotably mounted on said horizontal ledge and which cooperates with said cup, the locking means comprising means defining teeth for actuating the locking means when the position of said second pendular mass is modified owing to an acceleration.

* * * * *